(12) United States Patent
Elledge et al.

(10) Patent No.: US 7,047,350 B2
(45) Date of Patent: May 16, 2006

(54) DATA PROCESSING SYSTEM HAVING A SERIAL DATA CONTROLLER

(75) Inventors: Mark E. Elledge, Austin, TX (US); John J. Vaglica, Austin, TX (US); Sreedharan Bhaskaran, Singapore (SG); Allen Guoyuan Deng, Hong Kong (HK)

(73) Assignee: Freescale Semiconductor, Inc., Austin, TX (US)

( * ) Notice: Subject to any disclaimer, the term of this patent is extended or adjusted under 35 U.S.C. 154(b) by 194 days.

(21) Appl. No.: 10/683,778

(22) Filed: Oct. 10, 2003

(65) Prior Publication Data

US 2005/0080975 A1   Apr. 14, 2005

(51) Int. Cl.
 *G06F 13/00*   (2006.01)
(52) U.S. Cl. ...................... 710/317; 370/357
(58) Field of Classification Search ............ 710/316, 710/317; 370/357, 387, 388, 389, 366
See application file for complete search history.

(56) References Cited

U.S. PATENT DOCUMENTS

| | | | |
|---|---|---|---|
| 4,736,362 A | 4/1988 | Clark | |
| 5,596,578 A | 1/1997 | Cunningham | |
| 5,796,733 A * | 8/1998 | Norris | 370/366 |
| 6,188,686 B1 * | 2/2001 | Smith | 370/388 |
| 6,760,328 B1 * | 7/2004 | Ofek | 370/389 |
| 6,801,518 B1 * | 10/2004 | Mullaney et al. | 370/343 |
| 2002/0177474 A1 | 11/2002 | Oliviera | |

FOREIGN PATENT DOCUMENTS

WO   WO 02/096078 A1   11/2002

* cited by examiner

*Primary Examiner*—Tim Vo
*Assistant Examiner*—Clifford Knoll
(74) *Attorney, Agent, or Firm*—Daniel D. Hill; Michael P. Noonan

(57) ABSTRACT

A data processing system (30) includes two processors (70, 80) and a serial data controller (36) for selectively multiplexing serial data signals between one or more of a plurality of serial data devices (40, 42, 44, 46, 74, 76, 82) The serial data controller (36) includes one or more host ports (50, 52, 54) and one or more peripheral ports (56, 58, 60, 62) coupled together through a switching matrix (64). A control circuit (66) and a plurality of control registers (68) are used to configure and control a serial data path created between two or more ports including clock and frame synchronization timing of the data path.

30 Claims, 5 Drawing Sheets

DATA PROCESSING SYSTEM HAVING A SERIAL DATA CONTROLLER

FIELD OF THE INVENTION

This invention relates to data processing, and more particularly to a data processing system having a serial data controller.

BACKGROUND OF THE INVENTION

Wireless devices, such as cellular handsets are being manufactured with more, increasingly complex, features in smaller form factors. As the complexity of applications supported by wireless devices increases, more hardware is required on an integrated circuit to support the new applications. For example, an application processor (AP) and additional audio devices (such as stereo digital-to-analog converters (DACs) and Bluetooth codecs) have been added to the system in addition to the traditional baseband processor. In order to maximize the system's flexibility, both the baseband processor and the AP processor should be able to utilize all of the audio resources in the system.

A simple solution to the problem of sharing the audio resources between multiple processors is to connect some of the audio devices to one processor and the rest of the audio devices to the other processor as illustrated in FIG. 1. FIG. 1 illustrates, in block diagram form, data processing system 10 in accordance with the prior art. Data processing system 10 includes processors 12 and 14, and audio devices 16, 18, 20, and 22, where audio device 16 is a voice codec, audio device 18 is a Bluetooth module, audio device 20 is a stereo DAC, and audio device 22 is an external access port. By way of illustration, processor 12 has one input/output (I/O) port 15 coupled to communicate with both audio devices 16 and 18. Processor 14 has an I/O port 17 coupled to communicate with audio device 20 and an I/O port 19 coupled to communicate with audio device 22. Also, processors 12 and 14 are coupled together so data can be passed between them. In data processing system 10, both processors can access all of audio devices 16, 18, 20, and 22. However, if for example, processor 14 wants to send data to one of audio devices 16 and 18, processor 14 must first pass the data to processor 12 which then sends the data to the desired audio device 16 or 18.

There are several disadvantages to passing data between the processors in this example. First, both processors must be in a RUN operating mode in order for processor 14 data to reach audio devices 16 and 18. Second, interrupt frequency of the processors increases. Third, the maximum allowable interrupt timing of the processors decreases. Fourth, latency of the audio stream increases. Fifth, audio streams sent between processors require rate adaptation to account for subtle differences in clocks generated on the different processors.

Therefore, there is a need for a multi-processor data processing system that solves the above problems.

DETAILED DESCRIPTION OF THE PREFERRED EMBODIMENT

Figure 1:
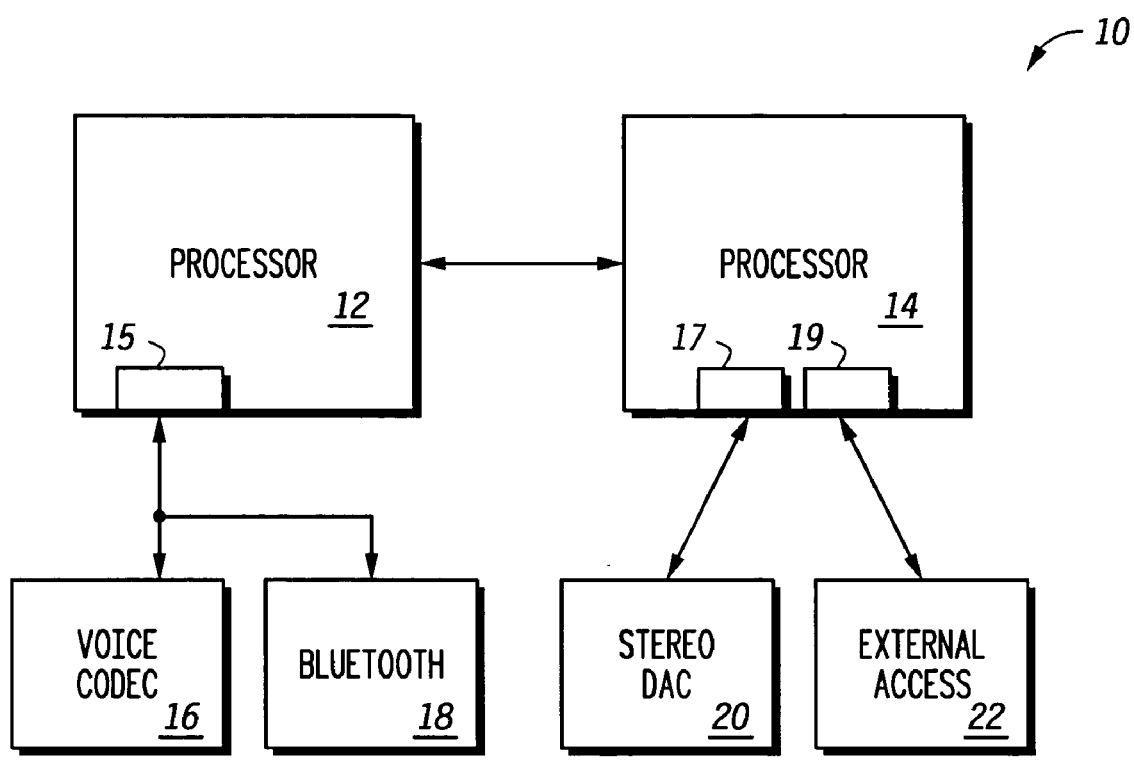
FIG. 1 illustrates, in block diagram form, a data processing system in accordance with the prior art.

Generally, the present invention provides a serial data controller in a data processing system for selectively multiplexing serial data signals from a plurality of serial data sources to a plurality of serial devices. The serial data controller is coupled between the serial data sources and the plurality of serial devices and includes one or more host ports and one or more peripheral ports coupled together through a switching matrix. A control circuit and a plurality of control registers are used to set up, or configure, and control the data path between the host and peripheral ports including clock and frame synchronization timing of the data path.

One embodiment of an apparatus in accordance with the present invention includes at least three serial devices and a serial data controller. The serial data controller includes at least three serial ports and a plurality of data paths. Each serial device is coupled to one of the serial ports. A first data path and a second data path of a plurality of data paths each have a first end portion coupled to one of the serial ports and a second end portion coupled to another one of the serial ports. A first one of the serial ports being coupled to a second one of the serial ports via the first data path and to a third one of the serial ports via the second data path. Control circuitry of the data controller is for dynamically selecting one or more of the data paths for transmission of serial data from a transmitting serial device to a selected subset of the serial devices and not to a deselected subset of the serial devices, wherein the data remains in a serial format throughout the transmission from the transmitting serial device to the selected serial devices.

In another embodiment, a special purpose audio information steering circuit includes a plurality of serial I/O ports and control circuitry. Each of the plurality of serial I/O ports is configured to couple to a corresponding serial device. Also, each of the I/O ports is coupled to each of the other I/O ports via a point-to-point data path through which audio information may be transmitted from a first serial device to a second serial device. The control circuitry dynamically selects one or more of the data paths for transmission of audio data from an I/O port receiving audio data to a selected subset of the I/O ports and not to a deselected subset of the I/O ports. In this way, the audio data remains in a serial format throughout the transmission from the receiving I/O port to the selected I/O ports.

In yet another embodiment, a special purpose audio information steering circuit includes a plurality of serial ports, a software configurable serial interface block and control registers. The plurality of serial ports including N host ports configured to receive data from multiple serial sources in a TDM network mode and M peripheral ports configured to receive data from a single selectable serial source. The software configurable serial interface block is coupled to each of the host ports and the peripheral ports.

The interface block includes M×N data paths, each data path being coupled between a host and a peripheral. The control registers are for storing control information to dynamically select one or more of the data paths for transmission of audio data from a first selected subset of the serial ports to a second selected subset of the serial ports and not to a deselected subset of the serial ports. The audio data remains in a serial format throughout the transmission from the first subset of serial ports to the second subset of serial ports.

The serial data controller in accordance with the present invention allows point-to-point communications between multiple processors and multiple devices. The sources, and/or destinations, of serial data can freely share serial devices in a standard configuration as well as dynamically creating (and/or disconnecting) networks of multiple serial devices. Also, any source/destination of data can access any serial device. For example, one source of data can send the data to multiple devices via a host port, and one source can send data to one device and receive data from another device. In addition, connectivity between devices and data sources/destinations can be modified through programming. Further, a data source/destination can share data with another source/destination, where the processors of, for example, a multi-processor system are not required to communicate with each other, as in the prior art, in order for the data to be shared.

Figure 2:
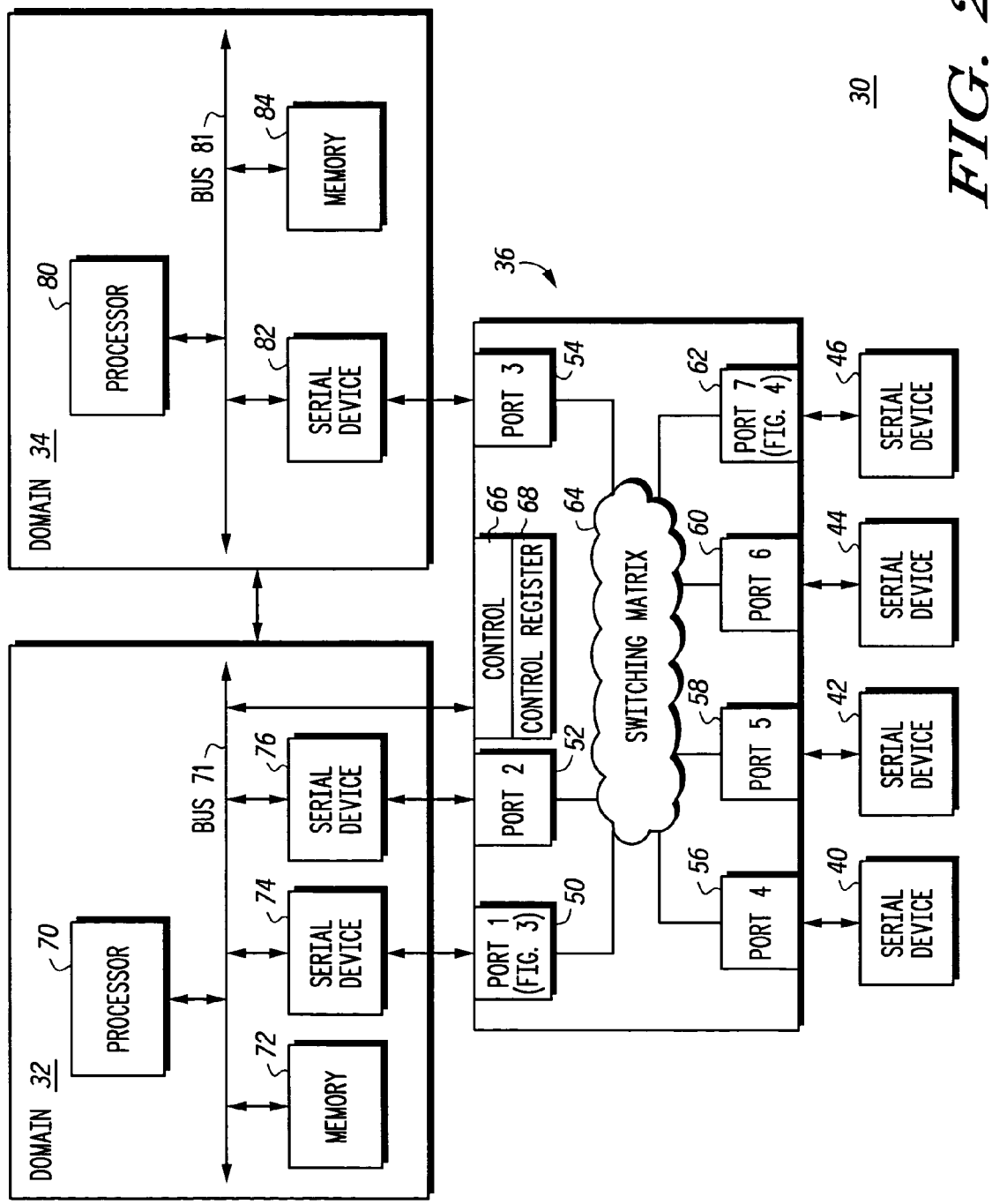
FIG. 2 illustrates, in block diagram form, a data processing system in accordance with the present invention.

FIG. 2 illustrates, in block diagram form, a data processing system 30 in accordance with the present invention. Data processing system 30 includes a clock domain 32 and a clock domain 34. Domain 32 includes a processor 70 coupled to a bus 71. Processor 70 generates a system clock for timing operations of processor 70 and the peripherals attached to processor 70. Memory 72, serial device 74, and serial device 76 are each coupled to bus 71. Clock domain 34 includes a processor 80 coupled to a bus 81. A serial device 82 and a memory 84 are coupled to bus 81. Processor 80 also generates a system clock for timing operations of processor 80 and the peripherals attached to processor 80. The system clock of processor 70 may, or may not, have the same clock frequency, phase, and duty cycle as the system clock of processor 80. In the illustrated embodiment, clock domain 32 is bi-directionally coupled to clock domain 34. Processors 70 and 80 may each be one of many different processor, or processor central processing units (CPU), types that are used in integrated circuit data processing systems, such as a digital signal processor (DSP), a reduced instruction set computer (RISC) processor, or the like, depending on which processor type best suits the particular applications.

Still referring to FIG. 2, a serial data controller 36 includes a plurality of ports 50, 52, 54, 56, 58, 60, and 62, labeled "PORT 1" through "PORT 7", respectively. Each of ports 50, 52, 54, 56, 58, 60 and 62 can be coupled to one of the other ports via a switching matrix 64. A control circuit 66 and a plurality of control registers 68 are used to configure and control the plurality of ports. The plurality of control registers 68 includes a plurality of user programmable bits, or bit fields, used to control the operation of serial data controller 36. In the illustrated embodiment, control circuit 66 and the plurality of control registers 68 are bi-directionally coupled to bus 71 to allow resources of domain 32, such as processor 70, to control the data pathways of serial data controller 36. In another embodiment, control circuit 66 and the plurality of control registers 68 may be bi-directionally coupled to bus 71, bus 81, or both bus 71 and bus 81.

Ports 50, 52, and 54 are characterized as host ports and ports 56, 58, 60, and 62 are characterized as peripheral ports. Host ports and peripheral ports can both send and receive data as well as be the master of the data flow, by providing clock timing as synchronization, if so desired. Host port 50 is bi-directionally coupled to serial device 74 of domain 32 and is described in more detail in the discussion of FIG. 3. Likewise, port 52 is bi-directionally coupled to serial device 76, port 54 is bi-directionally coupled to serial device 82, port 56 is bi-directionally coupled to a serial device 40, port 58 is bi-directionally coupled to a serial device 42, port 60 is bi-directionally coupled to a serial device 44, and port 62 is bi-directionally coupled to a serial device 46. Peripheral port 7 will be described in more detail in the discussion of FIG. 4. In the illustrated embodiment, the serial devices are for receiving or providing serial audio data. In other embodiments, the serial devices may be used for other types of serial data.

As mentioned above, serial data controller 36 includes two types of ports. Ports 50, 52, and 54 are similar to each other and are designated as "host" ports, and ports 56, 58, 60, and 62 are similar to each other and are designated as "peripheral" ports. A host port differs from a peripheral port in that the host ports include network mode logic (see FIG. 6). Also, a host port can receive data from multiple sources when operating in "network mode", whereas peripheral ports cannot. Data can be transmitted between a host port and a host port or a peripheral port, from a peripheral port to another peripheral port, or from a host port to more than one of the other ports.

In operation, serial data controller 36 allows for selectable control of serial communication data paths between any of ports 50, 52, 54, 56, 58, 60, and 62 via switching matrix 64. Serial data controller 36 can dynamically connect and/or disconnect a network of serial devices through the data paths of serial data controller 36. For example, serial device 74 of clock domain 32 may communicate serial data via port 50 and any other port in data processing system 30. The data paths are selected or deselected using control circuitry 66 and control registers 68.

In network mode, a host port can communicate with more than one host and/or peripheral port. Communications between the host port and the networked peripheral ports is on a time-slotted basis. Network mode is defined as a time-division multiplexed protocol mode for sending unique serial data from a host port to one or more other ports using a time-slotted frame. In network mode, both master-slave and slave-slave communication can take place.

Figure 3:
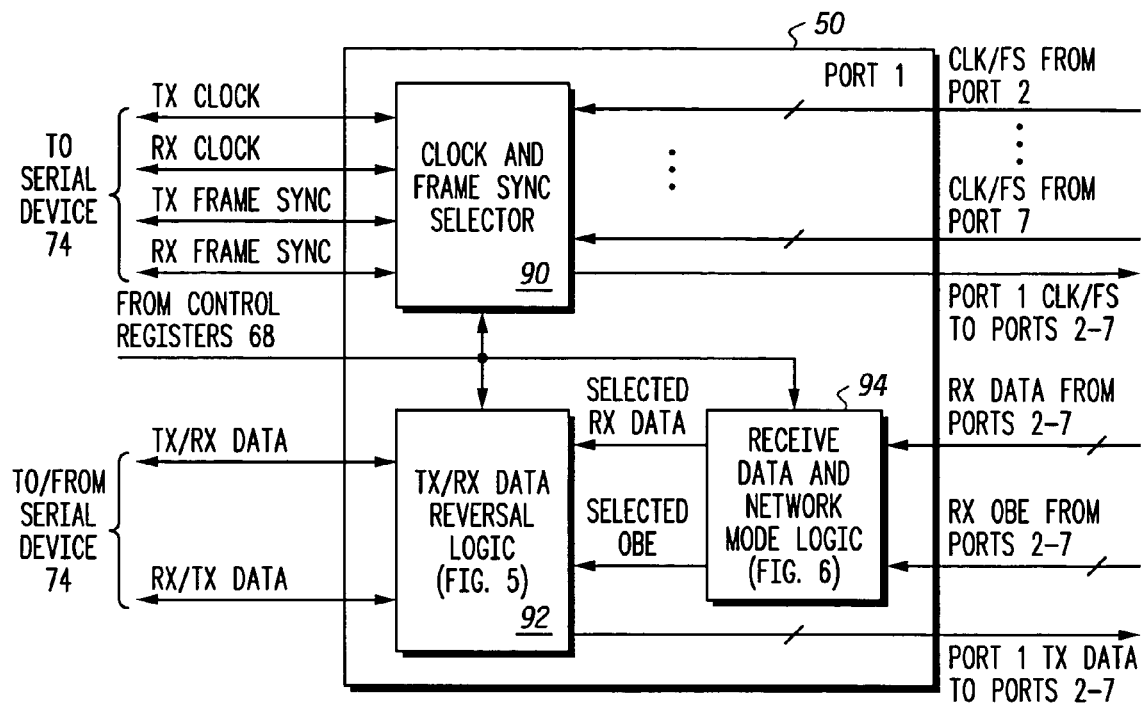
FIG. 3 illustrates, in block diagram form, one embodiment of a host port of FIG. 2.

FIG. 3 illustrates, in block diagram form, host port 50 of FIG. 2. Host ports 52 and 54 are similar to host port 50. Host port 50 includes clock and frame sync selector 90, transmit (TX)/receive (RX) data reversal logic 92, and receive data and network mode logic 94. Each of clock and frame synchronization selector 90, TX/RX data reversal logic 92 and receive data and network mode logic 94 have inputs for receiving control signals from control registers 68. Clock and frame sync selector 90 has a plurality of inputs for receiving clock (CLK) and frame synchronization (FS) signals labeled "CLK/FS FROM PORT 2" to "CLK/FS FROM PORT 7" from each of the other ports. CLK and FS selector 90 includes a plurality of outputs for providing a plurality of CLK and FS signals labeled "PORT 1 CLK/FS to PORTS 2–7" to inputs of the CLK and FS selectors of the other ports. In addition, clock and frame synchronization selector 90 includes an I/O terminal labeled "TX CLOCK", an I/O terminal labeled "RX CLOCK", an I/O terminal labeled "TX FRAME SYNC", and an I/O terminal labeled "RX FRAME SYNC". Depending on which device is serving as a master device, the clock and frame synchronizing signals can be generated and provided by any of the ports. As illustrated, CLK and FS selector 90 provides the clock and frame synchronizing signals to input terminals of serial device 74.

TX/RX data reversal logic 92 is bi-directionally coupled to serial device 74 for communicating serial data signals labeled "TX/RX DATA" and "RX/TX DATA". An output of TX/RX data reversal logic 92 is for providing data signals labeled "PORT 1 TX DATA TO PORTS 2–7" to any other selected port of data processing system 30. An input of TX/RX data reversal logic 92 is for receiving a data signal labeled "SELECTED RX DATA" from an output of receive data and network mode logic 94, and an input of TX/RX data reversal logic 92 is for receiving an output buffer enable signal from receive data and network mode logic 94 labeled "SELECTED OBE". Receive data and network logic 94 includes a plurality of input terminals from receiving data labeled "RX DATA FROM PORTS 2–7", and a plurality of input terminals for providing a plurality of enable signals labeled "RX OBE FROM PORTS 2–7". TX/RX data reversal logic 92 will be described in more detail in the discussion of FIG. 5, and receive data and network mode logic 94 will be described in more detail in the discussion of FIG. 6.

Host port 50 can be configured as a four-wire or six-wire interface. When configured as a synchronous four-wire interface, the clock and frame sync signals are made available on TX CLOCK and TX FRAME SYNC. When configured as an asynchronous six-wire interface, transmit clock and frame sync signals are made available on TX CLOCK and TX FRAME SYNC and receive clock and frame sync signals are made available on RX CLOCK and RX FRAME SYNC. TX/RX reversal logic 92 is used to provide flexibility in supporting network mode configurations by allowing the TX/RX DATA and the RX/TX DATA lines to be swapped so that mastership of the serial data path can be passed between multiple external devices coupled to a single host or peripheral port. Receive data and network mode logic 94 is used to support the network modes.

Figure 4:
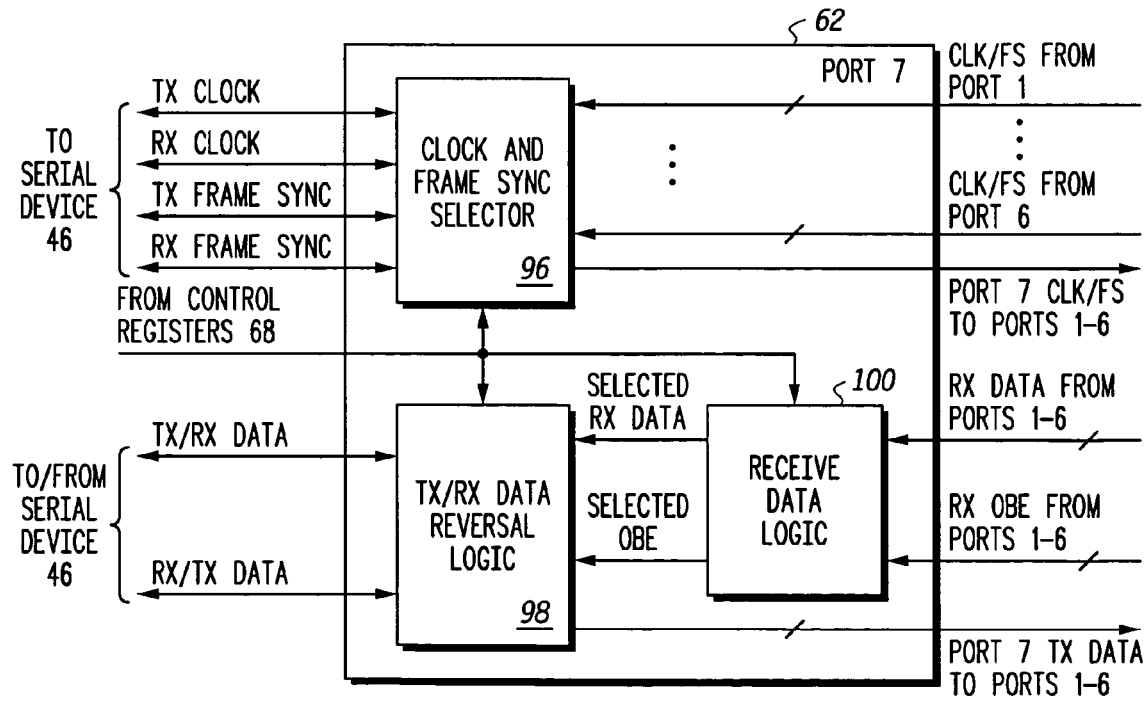
FIG. 4 illustrates, in block diagram form, one embodiment of a peripheral port of FIG. 2.

FIG. 4 illustrates, in block diagram form, one embodiment of the peripheral port 62 of FIG. 2. Peripheral port 62 is similar to host port 50 except that peripheral port 62 does not include the logic necessary for supporting network mode as a master. Port 62 includes clock and frame synchronizer selector 96, TX/RX data reversal logic 98, and receive data logic 100.

Each of clock and frame synchronizer selector 96, TX/RX data reversal logic 98 and receive data and network mode logic 100 have inputs for receiving control signals from control registers 68. Clock and frame sync selector 96 is similar to clock and frame synchronizer 90, and has a plurality of inputs for receiving clock (CLK) and frame synchronizer (FS) signals labeled "CLK/FS FROM PORT 1" to "CLK/FS FROM PORT 6" from each of the other ports. Also, CLK and FS selector 96 includes a plurality of outputs for providing a plurality of CLK and FS signals labeled "PORT 7 CLK/FS to PORTS 1–6" to inputs of the CLK and FS selectors of the other ports. In addition, clock and frame synchronizer selector 96 includes an I/O terminal labeled "TX CLOCK", an I/O terminal labeled "RX CLOCK", an I/O terminal labeled "TX FRAME SYNC", and an I/O terminal labeled "RX FRAME SYNC" to or from a serial device coupled to port 62 such as serial device 46. Depending on which device is serving as a master device, the clock and frame synchronization signals can be generated and provided by any of the ports. As illustrated, CLK and FS selector 96 provides the clock and frame synchronization signals to input terminals of serial device 46.

TX/RX data reversal logic 98 is bi-directionally coupled to serial device 46 for communicating serial data signals labeled "TX/RX DATA" and "RX/TX DATA". An output of TX/RX data reversal logic 98 is for providing data signals labeled "PORT 7 TX DATA TO PORTS 1–6" to any other selected port of data processing system 30. An input of TX/RX data reversal logic 98 is for receiving a data signal labeled "SELECTED RX DATA" from an output of receive data logic 100, and an input of TX/RX data reversal logic 98 is for receiving an output buffer enable signal from receive data logic 100 labeled "SELECTED OBE". Receive data logic 100 includes a plurality of input terminals from receiving data labeled "RX DATA FROM PORTS 1–6", and a plurality of input terminals for providing a plurality of enable signals labeled "RX OBE FROM PORTS 1–6".

TX/RX reversal logic 98 is used to provide flexibility in supporting network mode configurations by allowing the TX/RX DATA and the RX/TX DATA lines to be swapped so that mastership of the serial data path can be passed between multiple external devices coupled to a single host or peripheral port.

Figure 5:
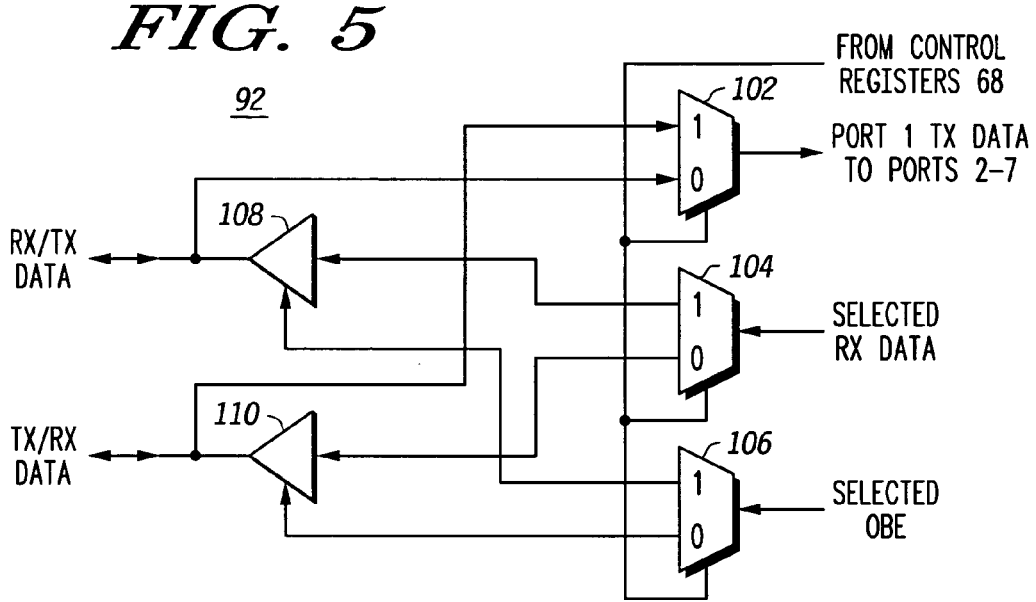
FIG. 5 illustrates, in partial block diagram form and partial logic diagram form, the TX/RX data reversal logic of FIG. 3 in more detail.

FIG. 5 illustrates, in partial block diagram form and partial logic diagram form, TX/RX data reversal logic 92 of FIG. 3 in more detail. TX/RX data reversal logic 92 includes multiplexer 102, decoders, or demultiplexers, 104 and 106, and buffer circuits 108 and 110. Multiplexer 102 has a first input terminal for receiving TX/RX DATA from serial device 74, a second input terminal for receiving RX/TX DATA from serial device 74, an output terminal for providing either the RX/TX DATA or the TX/RX DATA from serial device 74 to a selected one or more of PORTS 2–7 depending on the logic state of a control signal provided by control registers 68 to a control terminal of multiplexer 102. Decoder 104 has an input terminal for receiving SELECTED RX DATA from receiving data and network mode logic 94, a first output terminal coupled to an input of buffer circuit 108, and a second output terminal coupled to an input of buffer circuit 110, and a control terminal for receiving a control signal from control registers 68. Depending on the logic state of the control signal, the SELECTED RX DATA is provided to either one of buffer circuits 108 and 110. Buffer circuit 108 has an output terminal for providing buffered RX/TX DATA to serial device 74, and buffer circuit 110 has an output terminal for providing buffered TX/RX DATA to serial device 74. Accordingly, decoder 106 has an output terminal coupled to a control input of buffer circuit 108 and an output terminal coupled to a control input of buffer circuit 110, for providing the output enable signal SELECTED OBE to the appropriate one of buffer circuits 108 or 110 in response to a control signal from control registers 68.

TX/RX data reversal logic 92 is used to "reverse" or swap which of the RX/TX DATA or TX/RX DATA terminals communicates data. As indicated in FIG. 5, when TX DATA is to be provided from serial device 74 to a selected one or more of the other ports, a predetermined control bit from control registers 68 controls which of the first or second input terminals of multiplexer 102 provides the TX DATA from the RX/TX DATA path or the TX/RX DATA path to serial device 74. Also, if data is to be received from a selected one of the other ports, a predetermined control bit from control registers 68 determines which of the first or second output terminals of decoder 104 is selected to provide the data to one the RX/TX DATA or TX/RX DATA via one of buffer circuits 108 or 110. Concurrently with the operation of decoder 104, decoder 106 provides a select signal to the appropriate one of buffer circuits 108 or 110 as determined by the control registers 68. Note that the TX/RX data reversal logic 98 of FIG. 4 is similar to TX/RX data reversal logic 92.

Figure 6:
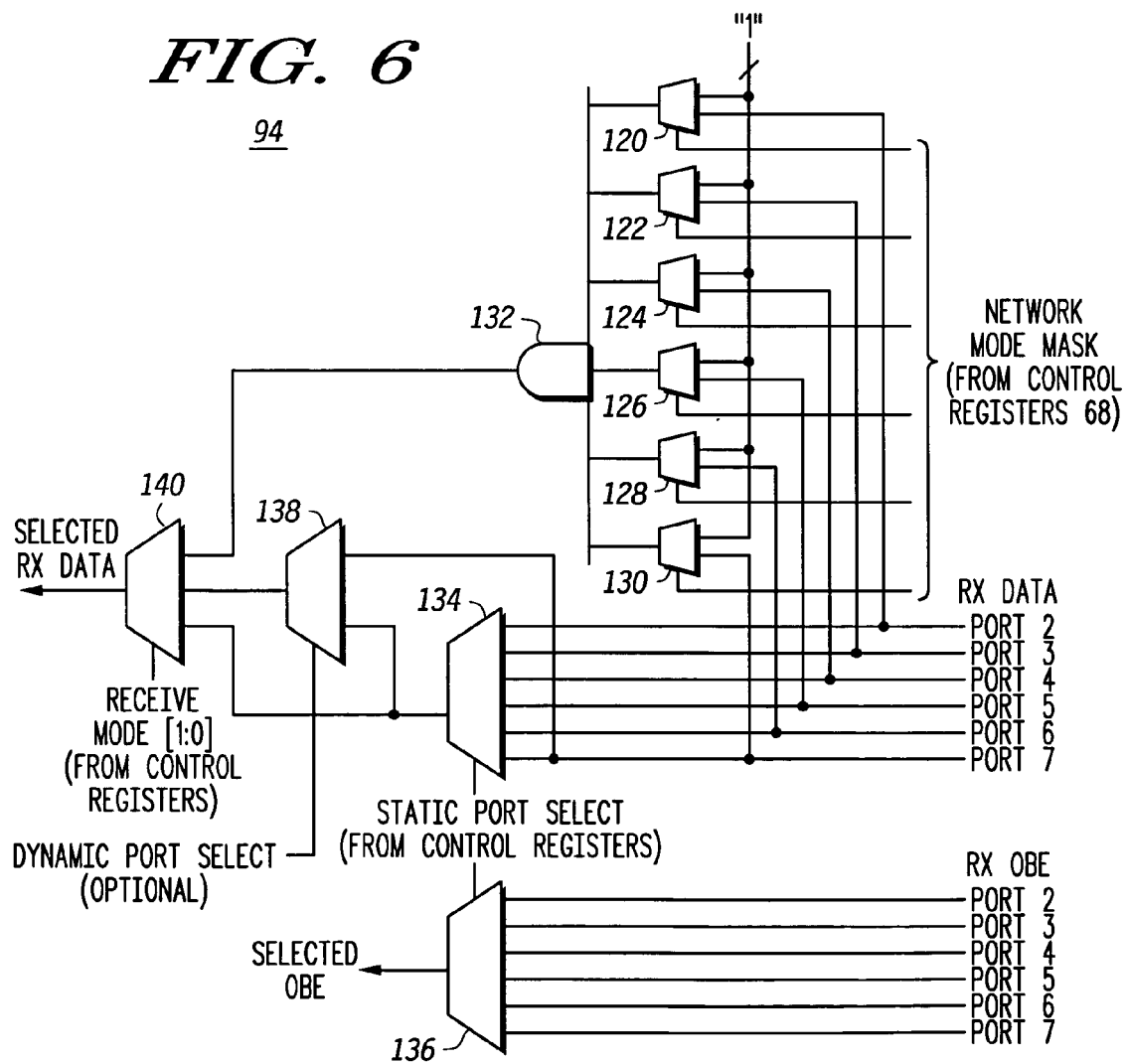
FIG. 6 illustrates, in logic diagram form, the receive data and network mode logic of FIG. 3 in more detail.

FIG. 6 illustrates, in logic diagram form, receive data and network mode logic 94 of FIG. 3 in more detail. Receive data and network mode logic 94 includes multiplexers 120, 122, 124, 126, 128, 130, 134, 136, 138, and 140, and AND logic gate 132. Each of multiplexers 120, 122, 124, 126, 128, and 130 have a first input terminal coupled to receive a logic "one", and a second input terminal coupled to receive RX DATA from one of ports 2–7. A control terminal of each of multiplexers 120, 122, 124, 126, 128, and 130 is coupled to receive a network mode mask signal from control registers 68. An output of each of multiplexers 120, 122, 124, 126, 128, and 130 is coupled to an input of AND logic gate 132. Multiplexer 134 has a plurality of input terminals, each of the plurality of input terminals coupled to receive RX DATA from one of the other ports. Multiplexer 134 provides one of the RX DATA signals from one of the other ports to an output terminal of multiplexer 134 depending of a STATIC PORT SELECT signal from control registers 68. Likewise, multiplexer 136 has a plurality of input terminals, each of the plurality of input terminals coupled to receive output buffer enable signal RX OBE from one of the other ports. In response to the STATIC PORT SELECT signal, multiplexer 136 provides the SELECTED OBE signal to determine which buffer circuit of TX/RX data reversal logic 92 will be enabled to provide the SELECTED RX DATA from multiplexer 140. Multiplexer 138 may be optionally included in received data and network mode logic 94, and has a first input terminal coupled to receive RX DATA from port 62 (PORT 7), a second input terminal coupled to the output terminal of multiplexer 134, a control terminal coupled to receive a DYNAMIC PORT SELECT signal and an output terminal. Multiplexer 140 has a first input terminal coupled to the output terminal of AND logic gate 132, a second input terminal coupled to the output terminal of multiplexer 138, and a third input terminal coupled to the output terminal of multiplexer 134. Multiplexer 140 provides the SELECTED RX DATA via one of its three input terminals in response to a control signal labeled "RECEIVE MODE [1:0]" from control registers 68.

Each of the host ports 50, 52, and 54 (FIG. 2) include the receive data and network mode logic 94 to determine which data lines from the other ports are used to create the SELECTED RX DATA line for the host port 50, 52, or 54. In a non-network mode of operation, control signal RECEIVE MODE [1:0]=0:0, and host port 50 is coupled in a point-to-point arrangement to receive data from one other selected port. For example, if host port 50 is to communicate with, for example, peripheral port 62, host port 50 is connected to serial device 74 of domain 32 processor 70 provides control information to control block 66 and to control registers 68. A data path is created from serial device 46 to serial device 76 through receive data logic 94 and TX/RX data reversal logic 92 of port 50. Clock and frame synchronization information is communicated to clock and frame sync selector 90. From port 62, the data will be transmitted to port 50 via switching matrix 64, which in one embodiment includes "cross-bar" logic. The data is received at port 50 via multiplexers 134 and 140 of receive data and network mode logic 94 (FIG. 6). The SELECTED RX DATA is provided to TX/RX data reversal logic 92 (FIG. 5) and outputted to serial device 74 via one of RX/TX DATA or TX/RX DATA.

A peripheral port can communicate with another peripheral port. In one case, one peripheral port is configured as a master and provides the clock and frame synchronization signals to the other peripheral port. In another case, both peripheral ports are configured as slave ports but with routing established from peripheral port to peripheral port by another port that provides the frame synchronization and clock timing.

A host port can communicate with another host port to provide a path for synchronous interprocessor communication.

In one network mode of operation, control signal RECEIVE MODE [1:0]=0:1, and host port 50 is coupled in a point-to-multi-point mode of operation. In the illustrated embodiment, control signal RECEIVE MODE [1:0] is a bit field of control registers 68. Referring to FIG. 6, the output of AND logic gate 132 is routed through multiplexer 140 to provide the SELECTED RX DATA to serial device 74. The NETWORK MASK MODE signals from control registers 68 selects the transmit signals of the ports that are to be connected in network mode. The transmit signals received at the RX DATA inputs of multiplexers 120, 122, 124, 126, 128, and 130 are ANDed together by AND logic gate 132 to from the SELECTED RX DATA. Only one of the ports 2–7 transmit data in a predetermined time-slot. All of the other ports remain at a logic high, or a logic "1" tristated, or "pulled-up" state during that time slot. Hence, non-active signals in the selection will be high and do not influence the output of AND logic gate 132.

In another, optional network mode of operation, control signal RECEIVE MODE [1:0]=1:0. This network mode uses optional multiplexer to synchronously select RX DATA signals from port 7 and one other selected port. In the optional network mode, control signal DYNAMIC PORT SELECT is generated using clock and frame synchronization timing signals to produce timing indicating the active time slots for the two ports.

Figure 7:
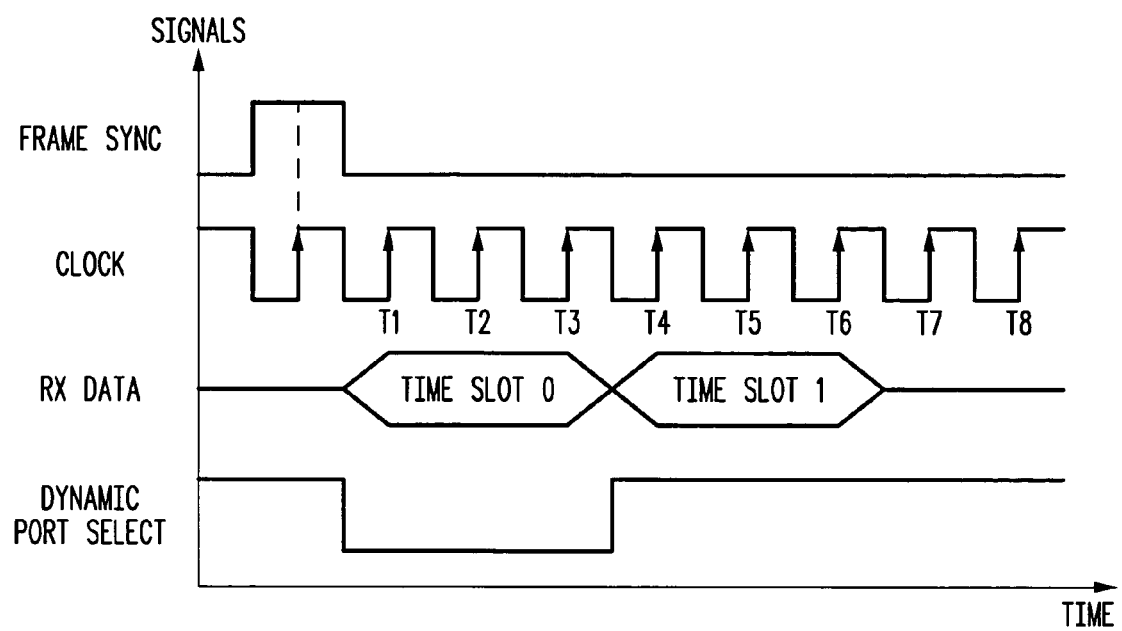
FIG. 7 illustrates a timing diagram of various signals of the receive data and network mode logic of FIG. 6.

FIG. 7 is a timing diagram of various signals of receive data and network mode logic 94 of FIG. 6. FIG. 7 is provided to illustrate one example of a network mode of operation. Prior to time T0 a frame synchronization signal from, for example, clock and frame synchronization selector 90 is used to start a data transfer from two or more of ports 52, 54, 56, 58, 60, and 62 to port 50. The RX DATA is transmitted in timeslots such as time slots 0 and 1. In the illustrated embodiment, three bits of data are transmitted per timeslot. For example, timeslot 0 may be used by port 7 and timeslot 1 may be used by port 6. Other timeslots, not shown, may be used by other selected ports. The ports that are active in the network are determined by the NETWORK MODE MASK signal from control registers 68. Note that the arrows indicate that the data is transmitted on the rising edges of the CLOCK signal. In another mode, the data may be transmitted on the falling edges of the CLOCK signal. The three bits of data of timeslot 0 are transmitted at times T1, T2, and T3. The three bits of data of timeslot 1 are transmitted at times T4, T5, and T6.

Serial data controller 36 provides several advantages over the prior art. For example, with serial data controller 36 there is no need from parallel-to-serial or serial-to-parallel data conversions. Also, multiple data rates can be accommodated on different data paths. In addition, serial data controller 36 provides separate transmit and receive clock rates and data paths. In addition, data is only sent to those devices that require data, thereby saving power and providing a more secure system than the prior art.

Various changes and modifications to the embodiments herein chosen for purposes of illustration will readily occur to those skilled in the art. For example, variations in the types of conductivities of transistors, the types of transistors, etc. may be readily made. To the extent that such modifications and variations do not depart from the scope of the invention, they are intended to be included within the scope thereof, which is assessed only by a fair interpretation of the following claims.

What is claimed is:

1. An apparatus comprising:
   at least three serial devices;
   a serial data controller comprising:
      at least three serial ports, each serial device being coupled to one of the serial ports and each serial port comprising timing and frame synchronization selector logic coupled to receive and transmit timing signals and frame synchronization signals for controlling timing and frame synchronization of a data transmission from any one of the at least three serial ports to another one of the at least three serial ports;
      a plurality of data paths including at least a first data path and a second data path, each data path having a first end portion coupled to one of the serial ports and a second end portion coupled to another one of the serial ports, a first one of the serial ports being coupled to a second one of the serial ports via the first data path and to a third one of the serial ports via the second data path; and
      control circuitry for dynamically selecting one or more of the data paths for transmission of serial data from a transmitting serial device to a selected subset of the serial devices and not to a deselected subset of the serial devices, wherein the data remains in a serial format throughout the transmission from the transmitting serial device to the selected serial devices.

2. The apparatus of claim 1 wherein the plurality of data paths comprises a third data path, the second one of the serial ports being coupled to the third one of the serial ports via the third data path.

3. The apparatus of claim 1 wherein serial data may be dynamically selectively transmitted from any one of the serial devices to any other of the serial devices via a corresponding one of the data paths.

4. The apparatus of claim 1 wherein the at least three serial devices are comprised within at least two integrated circuits.

5. The apparatus of claim 1 wherein a first serial port comprises:
   receive data logic for receiving serial data from each other serial port and for selecting serial data from one of the other serial ports; and
   data reversal logic coupled to receive the selected serial data from the receive data logic and coupled to receive and provide serial data from and to a first serial device coupled to the first serial port.

6. The apparatus of claim 5 wherein the apparatus comprises a plurality of control registers coupled to provide control signals to the timing selector logic, the data reversal logic and the receive data logic, the content of the control registers being definable through software.

7. The apparatus of claim 5 wherein the timing signals and frame synchronization signals are transmitted between each of the at least three serial ports separately from the data transmission.

8. The apparatus of claim 5 wherein the receive data logic comprises:
   a receive data selection circuit coupled to receive a serial data signal from each of the other serial ports and coupled to provide a selected one of the serial data signals; and
   a buffer enable selection circuit coupled to receive a buffer enable signal from each of the serial ports of the serial data controller and for providing a selected buffer enable signal to the data reversal logic of the corresponding serial port.

9. The apparatus of claim 8 wherein the apparatus further comprises network mode logic, the network mode logic comprising:
   a plurality of control registers coupled to provide at least one network mode mask control signal to the network mode logic; and
   a network mode selection circuit coupled to receive the serial data signals from the other serial ports and coupled to provide a selected one of the serial data signals under control of the at least one network mode mask control signal.

10. The apparatus of claim 9 wherein the receive data logic further comprises:
    a multiplexer coupled to receive the selected serial data signal from the network mode logic at a first input, the selected serial data signal from the receive data selection circuit at a second input, a receive mode control signal at a control input to select an output signal depending on an indication of whether the selected serial data is being transmitted in network mode or in a point-to-point mode.

11. The apparatus of claim 8 wherein the data reversal logic comprises:
    first and second buffers coupled to provide serial data to the first serial device;
    a first demultiplexer coupled to receive the selected serial data from the receive data logic and coupled to provide the selected serial data to a selected one of the first and second buffers;
    a second demultiplexer coupled to receive the selected buffer enable signal from the receive data logic and coupled to provide the selected buffer enable signal to a selected one of the first and second buffers.

12. The apparatus of claim 8 wherein the receive data selection circuit comprises a first multiplexer coupled to receive a static port select control signal from a control register at a control input, the apparatus further comprising a second multiplexer coupled to receive a dynamic port select control signal at a control input, the selected serial data from the first multiplexer at a first data input, and a serial data from a predetermined serial port at a second data input.

13. The apparatus of claim 9 wherein the first serial port is a host serial port configurable for network mode communication from a host serial device to a plurality of serial devices, the apparatus further comprising a peripheral serial port configurable for point-to-point mode communication from a corresponding peripheral serial device to a selected other serial device, the peripheral serial port comprising:
    timing selector logic coupled to receive and transmit message timing signals corresponding to messages sent from each of the serial devices;
    receive data logic for receiving serial data from each other serial port and for selecting serial data from one of the other serial ports; and data reversal logic coupled to receive the selected serial data from the receive data logic and coupled to receive and provide serial data from and to the peripheral serial device.

14. In a system including at least three serial devices and a serial data controller, each serial device being coupled to each other serial device via a corresponding data path of the serial data controller, a method for communicating serial data, the method comprising:
provided at least three serial ports, each serial device being coupled to one of the at least three serial ports;
dynamically selecting one or more of the data paths for transmission of serial data from a transmitting serial port to a selected subset of the serial port;
dynamically deselecting one or more of the data paths to prevent transmission of serial data from the transmitting serial port to a deselected subset of serial ports;
providing timing and frame synchronization signals from any one of the at least three serial ports for clocking and synchronizing the transmission of serial data from the transmitting port to the selected serial ports; and
transmitting the serial data from the transmitting serial port to the selected serial ports such that the serial data remains in a serial format throughout the transmission from the transmitting serial device to the selected serial devices.

15. The method of claim 14 further comprising:
selecting one data path for transmission of serial data during a point-to-point mode transmission; and
selecting multiple data paths for transmission of serial data from a transmitting serial device to a plurality of serial devices during a network mode transmission.

16. An apparatus comprising:
at least three serial devices, each of the serial devices configured to transmit serial data at a corresponding clock rate, wherein at least two of the serial devices are configured to transmit at different clock rates;
a serial data controller comprising:
at least three serial ports, each serial device being coupled to one of the serial ports, each serial port for providing the serial data at the corresponding clock rate during a data transmission of the serial data; and
a plurality of data paths, each data path having a first end portion coupled to one of the serial ports and a second end portion coupled to another one of the serial ports, wherein the serial data may be dynamically selectively transmitted from any of the serial devices to any other of the serial devices via a corresponding one of the data paths to the exclusion of deselected serial devices, wherein the data remains in a serial format throughout the transmission from the transmitting serial device to the receiving serial device.

17. The apparatus of claim 16 wherein the plurality of serial devices comprises:
a host serial data source, the host serial data source comprising
a processor; and
a memory coupled to the processor via a bus; and
a plurality of peripheral serial data sources, each of the peripheral serial data sources being selectively coupled to any of the host serial data sources in any of a plurality of dynamically selectable network mode configurations.

18. The apparatus of claim 16 wherein the host serial data sources and at least a first set of the peripheral serial data sources are comprised within a wireless communication device.

19. The apparatus of claim 16 wherein the serial data controller comprises clock and frame synchronization selection logic for dynamically selecting a first one of the plurality of serial data source devices to provide a frame sync signal for a serial data transfer and for dynamically selecting a second one of the plurality of serial data source devices to provide a clock signal for the serial data transfer.

20. The apparatus of claim 16 wherein the serial data controller comprises data reversal logic for dynamically reconfiguring a receive data path as a transmit data path, and a transmit data path as a receive data path.

21. The apparatus of claim 16 wherein each serial port comprises:
clock and frame synchronization selection logic for dynamically selecting which of the plurality of serial data source devices provides a frame sync signal for a serial data transfer and for dynamically selecting which of the plurality of serial data source devices provides a clock signal for the serial data transfer;
data reversal logic for reversing receive and transmit data paths through the serial port; and
receive data logic for selecting one of the other serial ports from which to receive data.

22. The apparatus of claim 21 wherein at least one of the serial ports comprises network mode logic coupled to receive serial data signals from others of the serial ports and coupled to provide a selected one of the serial data signals under control of a network mode mask control signal.

23. The apparatus of claim 16 wherein each serial port comprises a plurality of control registers for storing data path selection information.

24. A special purpose audio information steering circuit comprising:
a plurality of serial I/O ports, wherein each of the I/O ports is configured to couple to a corresponding serial device, and wherein each of the I/O ports is coupled to each of the other I/O ports via a point-to-point data path through which audio information may be transmitted from a first serial device to a second serial device each serial I/O port comprising timing and frame synchronization selector logic coupled to receive and transmit timing signals and frame synchronization signals for controlling timing and frame synchronization of an audio data transmission from any one of the plurality of serial I/O ports to another one of the plurality of serial I/O parts; and
control circuitry for dynamically selecting one or more of the data paths for transmission of audio data from an I/O port receiving audio data to a selected subset of the I/O ports and not to a deselected subset of the I/O ports, wherein the audio data remains in a serial format throughout the transmission from the receiving I/O port to the selected I/O ports.

25. A special purpose audio information steering circuit comprising:
a plurality of serial ports, the plurality of serial ports including
N host ports configured to receive data from multiple serial sources in a TDM network mode, each of the N host serial ports comprising timing and frame synchronization selector logic coupled to receive and transmit timing signals and frame synchronization signals for controlling timing and frame synchronization of a data transmission from any of the plurality of serial ports; and M peripheral ports configured to receive data from a single selectable serial source, each of the M peripheral ports comprising timing and frame synchronization selector logic coupled to receive and transmit timing signals and frame synchronization signals for controlling timing and frame synchronization of a data transmission from any of the plurality of serial ports;

a software configurable serial interface block coupled to each of the host ports and the peripheral ports, the interface block including M×N data paths, each data path being coupled between a host and a peripheral; and control registers for storing control information to dynamically select one or more of the data paths for transmission of audio data from a first selected subset of the serial ports to a second selected subset of the serial ports and not to a deselected subset of the serial ports, wherein the audio data remains in a serial format throughout the transmission from the first subset of serial ports to the second subset of serial ports.

26. The special purpose audio information steering circuit of claim 25 wherein the control registers are configured to store control information for selecting a mode of communication, the first subset and the second subset each include one selected serial port during a selected point-to-point communication and the first subset including at least one serial port during a selected network mode communication.

27. The method of claim 14, further comprising:
dynamically selecting at least one of the serial devices for participation in a time division multiplexed network; and
dynamically deselecting at least one of the serial devices from participation in the time-division-multiplexed network.

28. The method of claim 27 further comprising the steps of:
dynamically selecting a clock master device from among the serial devices; and
dynamically selecting a frame synchronization master device from among the serial devices.

29. The method of claim 27 further comprising the step of dynamically selecting a network master from among the serial devices.

30. The method of claim 27 further comprising the step of transmitting serial data from a first serial devices to a second serial devices without submitting a request from the first serial data source to a third serial data source.

* * * * *

UNITED STATES PATENT AND TRADEMARK OFFICE
CERTIFICATE OF CORRECTION

PATENT NO. : 7,047,350 B2 Page 1 of 1
APPLICATION NO. : 10/683778
DATED : May 16, 2006
INVENTOR(S) : Mark E. Elledge It is certified that error appears in the above-identified patent and that said Letters Patent is hereby corrected as shown below:

In Column 14, Line 23, Claim No. 30:
    Change "from a first serial devices to a second" to --from a first serial data source to a second--

In Column 14, Line 24, Claim No. 30:
    Change "serial devices without submitting" to --serial data source without submitting--

Signed and Sealed this

Twenty-second Day of December, 2009

David J. Kappos
*Director of the United States Patent and Trademark Office*